United States Patent [19]

Schmidt et al.

[11] Patent Number: 4,860,222

[45] Date of Patent: Aug. 22, 1989

[54] METHOD AND APPARATUS FOR MEASURING ENGINE MASS AIR FLOW

[75] Inventors: Edward H. Schmidt; Marvin E. Carpenter, both of Utica; David W. Walters, Sterling Heights, all of Mich.

[73] Assignee: General Motors Corporation, Detroit, Mich.

[21] Appl. No.: 148,296

[22] Filed: Jan. 25, 1988

[51] Int. Cl.$^4$ ............................................. G06F 15/20
[52] U.S. Cl. ................... 364/550; 73/118.2; 123/478; 364/431.05; 364/510
[58] Field of Search ............ 364/431.05, 431.07, 364/510, 550; 123/436, 478, 485; 73/118.1, 118.2, 861.52, 861.63

[56] References Cited

U.S. PATENT DOCUMENTS

| | | | |
|---|---|---|---|
| 4,264,961 | 4/1981 | Nishimura et al. | 364/510 |
| 4,501,249 | 2/1985 | Amano et al. | 123/478 |
| 4,589,279 | 5/1986 | Mitsuyasu et al. | 73/118.2 |
| 4,630,206 | 12/1986 | Amamo et al. | 364/431.07 |
| 4,640,253 | 2/1987 | Kamai | 123/478 |
| 4,658,640 | 4/1987 | Kido et al. | 73/118.2 |
| 4,736,302 | 4/1988 | Kinugawa et al. | 364/431.05 |

Primary Examiner—Parshotam S. Lall
Assistant Examiner—Kevin J. Teska
Attorney, Agent, or Firm—Howard N. Conkey

[57] ABSTRACT

A microprocessor based fuel control for automotive vehicle engines samples the measured air flow rate at fixed intervals and calculates the air mass flow for a cylinder interval which varies with engine speed. A sensor on the engine detects cylinder position for the cylinder interval determination. An independent clock controls the air flow rate sampling periods. During each cylinder interval the air flow rate is integrated for each whole sampling period and is approximated for each partial period at the boundaries of the cylinder interval. The results are summed to obtain the mass air flow for the cylinder interval.

7 Claims, 4 Drawing Sheets

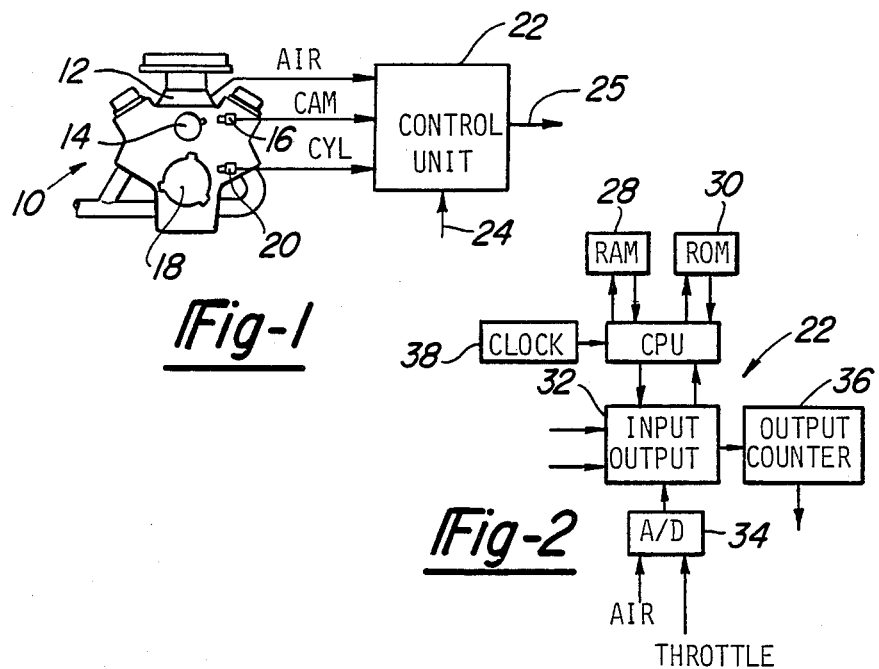
Fig-1
Fig-2
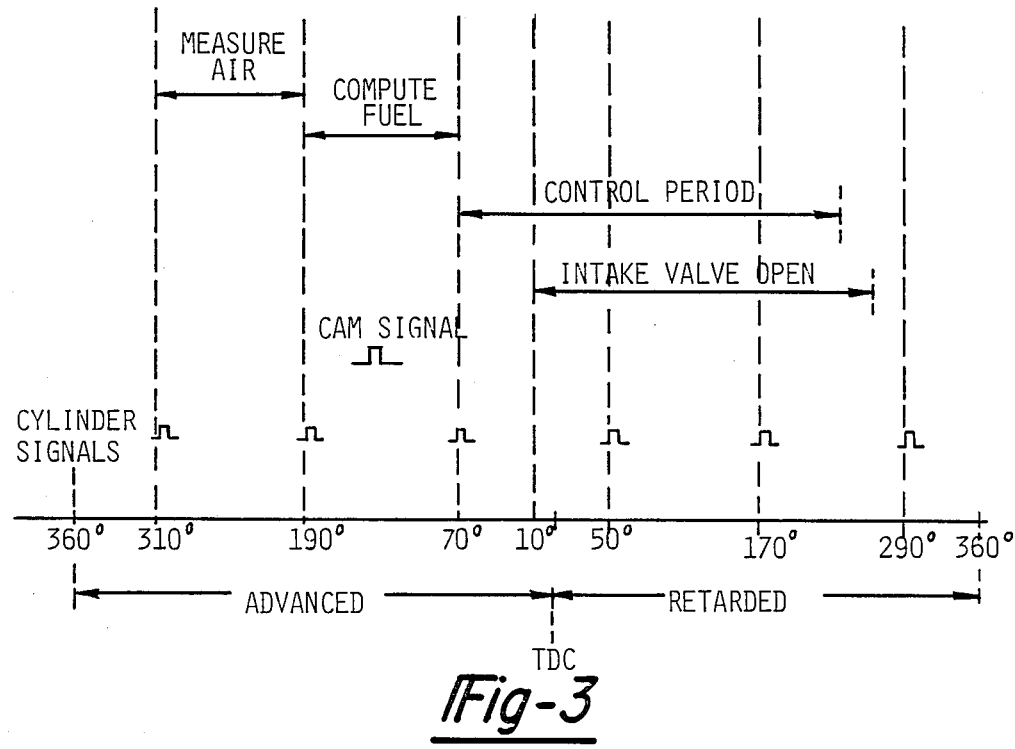
Fig-3

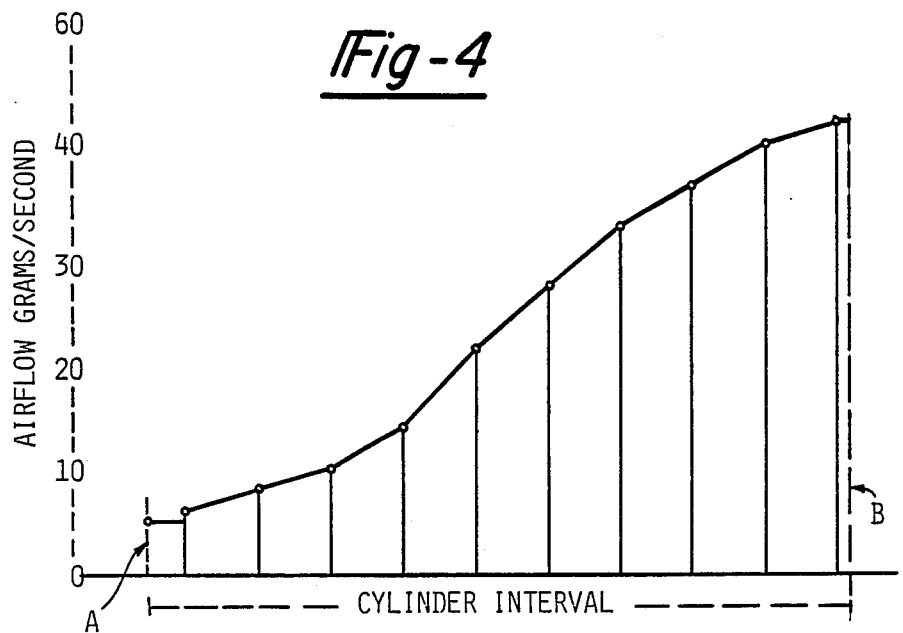
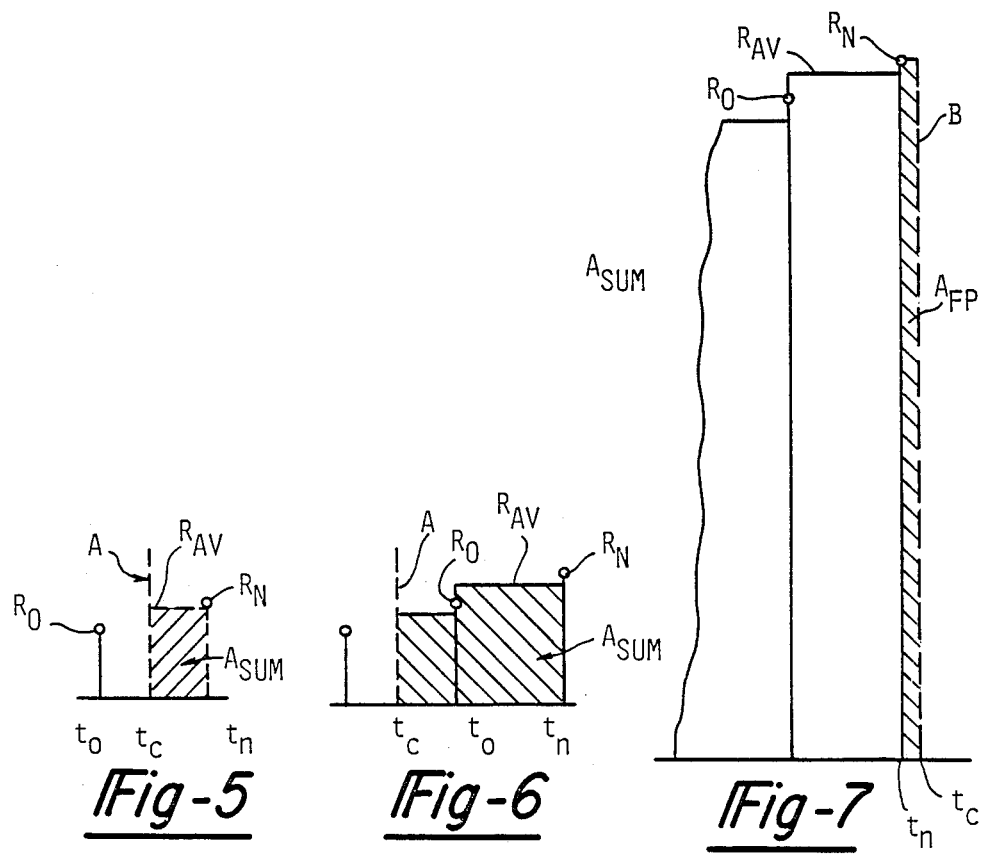

METHOD AND APPARATUS FOR MEASURING ENGINE MASS AIR FLOW

FIELD OF THE INVENTION

This invention relates to engine mass air flow measurement and particularly to a method and apparatus for accurately determining the mass air flow for each cylinder.

BACKGROUND OF THE INVENTION

In order to operate automotive vehicles within mandated exhaust emission limits it is necessary to properly control to a selected air/fuel ratio and that requires a determination of the mass air flow so that the fuel injection rate can be correctly adjusted. In addition to emission concerns, it is desired to obtain fuel consumption efficiency and good engine performance. All of these objectives tax the capabilities of fuel control systems. Rapid time response as well as precision of mass air flow measurement have become high priority goals.

It has been a common practice to measure mass air flow at a fixed time interval. In the event of transients in air flow due to changes in engine operating parameters it is necessary to employ special transient calculations to approximate the real instantaneous airflow. The calculations are time consuming and lacking in accuracy.

It has been proposed to incrementally sample air flow based on engine rotation during an intake valve event. The sampling rate varies with engine speed and thus requires engine speed information and further cannot be optimally matched to the response time of the air flow meter.

SUMMARY OF THE INVENTION

It is therefore an object of the invention to provide a method and apparatus for measuring engine intake air with accuracy and fast response. A further object is to accomplish such measurement to obtain air flow values for each cylinder of an engine. Another object is to measure engine air flow at a fixed time rate and convert the information to a mass air flow per cylinder.

The method of the invention is carried out by measuring the mass air flow for each cylinder of an engine comprising the steps of allocating an air flow measuring interval to each cylinder, generating cylinder position signals indicating the beginning and end boundaries of the interval for each cylinder, periodically sampling the air flow rate at sampling times set by a fixed sampling rate to provide a plurality of whole sampling periods in each flow measuring interval and partial sampling periods at the beginning and end of each interval, integrating the flow rate in each whole sampling period in an interval to determine the mass flow in each whole period, calculating the mass flow in each partial period in an interval, and accumulating the mass flows calculated in the interval to determine the total mass air flow for the corresponding cylinder.

The apparatus of the invention is carried out by means for measuring the mass air flow for each cylinder of an engine comprising; signal means operatively coupled to the engine for generating cylinder pulses as a function of cylinder positions, an air flow meter for measuring air flow rate at fixed sampling times independent of cylinder position, the sampling times occurring repetitively during each cylinder interval, and microprocessor based means for calculating mass air flow coupled to the signal means and the meter including; (a) means for determining the average air flow rate for each period between sampling times and the mass air flow for each such period, (b) means for determining the approximate flow rates and the times of each partial period between sampling times and interval boundaries and for determining the mass air flow from the determined times and flow rates, and (c) means for summing the mass air flow of all the periods and partial periods for each interval whereby the mass air flow for a given cylinder is obtained.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic view of a control with engine mounted sensors for carrying out the invention, FIG. 2 is a block diagram of a microprocessor configuration for carrying out the invention, FIG. 3 is a time chart of air measurement and fuel control events, FIG. 4 is a graph of air flow measurements over a cylinder interval illustrating the method of the invention, FIGS. 5, 6 and 7 are graphs of portions of the graph of FIG. 4 illustrating details of air flow calculation.

DESCRIPTION OF THE PREFERRED EMBODIMENT

Figure 8:
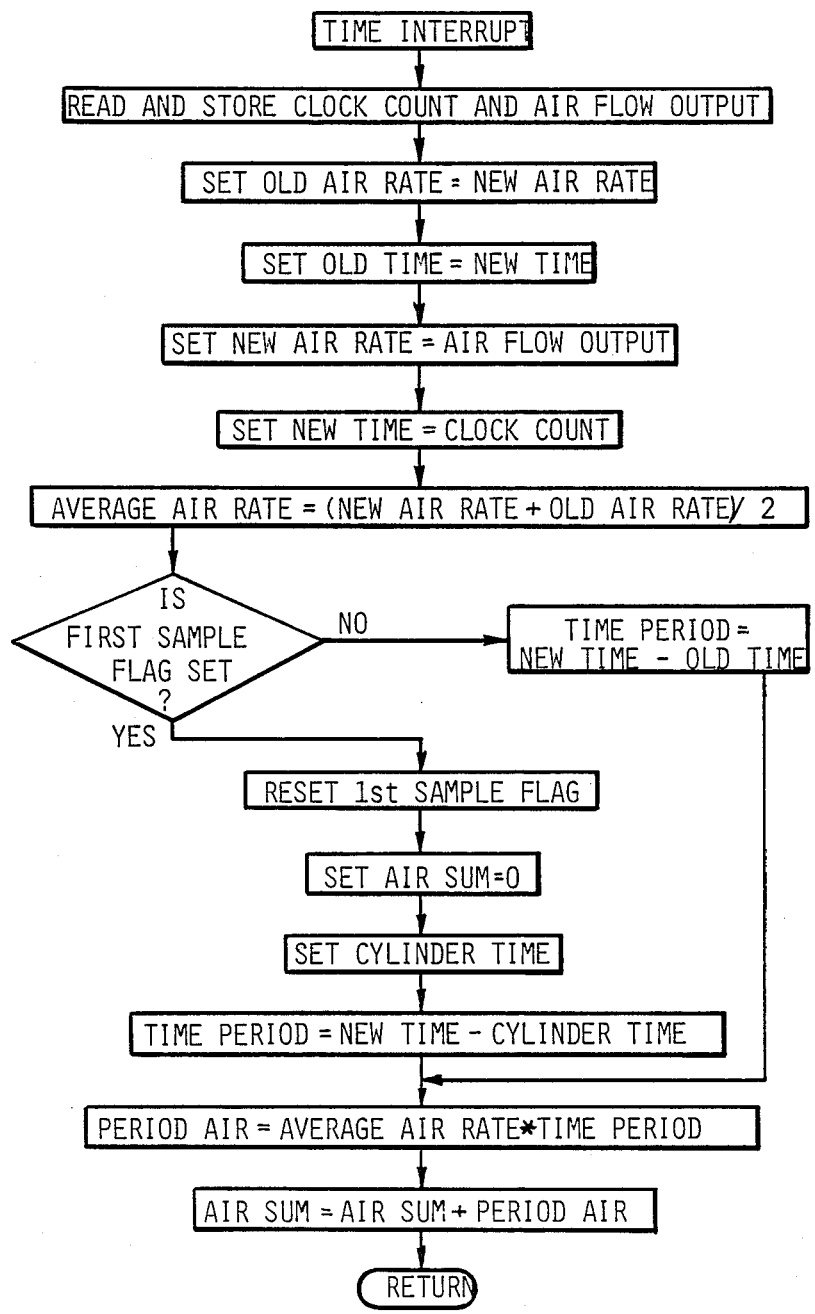
FIGS. 8 and 9 are flow charts of time interrupt and cylinder position interrupt routines used by the system computer to calculate mass air flow according to the invention.

While the invention applies to various engine sizes, it is described here as applied to a six cylinder engine. In FIG. 1 the engine 10 has an air flow meter 12 in the induction passage. The meter 12 must be a fast response type such as may be provided by a hot wire constant temperature anemometer. A cam position sensor 14 comprises a camshaft driven wheel with one tooth and a fixed pickup 16 to produce a cam pulse (CAM) for every camshaft revolution or every two crankshaft revolutions. A cylinder position sensor 18 comprises a crankshaft mounted wheel with three teeth and a fixed pickup 20 to produce three cylinder pulses (CYL) for each crankshaft revolution. Thus in two crankshaft revolutions six CYL pulses occur, one for each cylinder. The cam pulse makes it possible to identify each cylinder pulse with a specific cylinder. A control unit 22 receives the three signals from the sensors as well as a throttle position signal on an input 24. The control unit 22 calculates the proper instantaneous fuel requirement and issues a fuel control command on output line 25.

The control unit 22 is a vehicle mounted digital computer based on a microprocessor which accepts the various input signals and processes them in accord with a predetermined program to provide an established fuel schedule. As seen in FIG. 2, the digital computer basically comprises a central processing unit (CPU) 26 which interfaces in the normal manner with a random access memory (RAM) 28, a read-only memory (ROM) 30, an input/output unit 32, an analog-to-digital converter (A/D) 34, an output counter 36 and a clock 38.

In general, the CPU 26 executes an operating program permanently stored in the ROM 30. Data is temporarily stored and retrieved from various ROM designated address locations in the RAM 28. Discrete input signals are sensed and the values of analog signals are determined via the input/output circuit 32, which receives directly the position input signals such as the camshaft position and cylinder position signals and the A/D 34 which receives the analog signals from the mass air sensor 12 and the accelerator pedal position sensor previously described. The output counter is used to fashion fuel control signals in the appropriate form as directed by the CPU.

As thus far described, the control unit and fuel control program are well known and are in common usage. The CPU executes a main loop routine which is repeated at frequent intervals. According to this invention, however, the mass air flow information is incorporated in an improved manner which allows better fuel control and simplified calculations. The main loop routine is modified by a regular periodic time interrupt which starts a short routine to read the air flow meter and update the mass air flow computation. The main loop routine is further modified by a cylinder position interrupt which identifies the time interval for air flow measurement for each cylinder and starts a routine to complete the mass air flow computation for the current cylinder.

FIG. 3 assists in visualizing the time relationship of the events relevant to the air measurement and fuel control for one cylinder. A similar chart would apply to other cylinders but the events would be phase shifted 120 degrees relative to the cam signal for each successive cylinder in the firing order. The x-axis is divided into several cylinder intervals bounded by the cylinder pulses CYL. They occur at 70 degrees before top dead center (TDC) and at multiples of 120 degrees from there. TDC refers to the top dead center for the fuel injection event and is 360 degrees from the top dead center for the spark event. The CAM pulse is used by the system to determine which pulse relates to which cylinder. On this chart, the cylinder pulse A at 310 degrees advanced is used to start the measurement interval for the cylinder in question and the following pulse B terminates the interval. Then during the next interval (190 to 70 degrees) the fuel quantity and the related injection pulse width and timing are computed for that cylinder. The actual injection takes place sometime during the control period which extends from 70 degrees advanced to 240 degrees retarded. The intake valve for that cylinder is open between 10 degrees advanced and 270 degrees retarded. It should be apparent that this timing results in the measurement of a particular aliquot of air just a moment before an air intake event, so that there is a high degree of correlation between the amount measured and the amount induced into that particular cylinder. It should also be apparent that the computer has specific functions during each time interval to assure proper measurement and control for a given cylinder, it will also make the same calculations for the other cylinders on a sequential basis. The emphasis of the following description is on the air measurement interval between cylinder pulses A and B.

The use of a fast response hot wire air meter allows a sampling rates for reliable readings at 320 Hz. Thus the computer is programmed to sample the air flow every 3.125 milliseconds regardless of engine speed. For one particular speed, the graph of FIG. 4 shows a cylinder interval between cylinder pulses A and B and ten air flow measurements that were sampled in that interval.

Obviously, at higher engine speeds the cylinder interval will be shorter and fewer air flow measurements will be sampled, It will be noted that the air flow sampling times and the cylinder pulses occur independently, resulting in a phase mismatch between the cylinder pulses and the time samples. As a result, the cylinder interval is divided into several whole periods of fixed size and two boundary regions or partial periods of variable size. The mass air flow is determined by integrating the air flow rate over the various periods. For each regular period, the two air flow rates bounding the period are averaged and the average is multiplied by the period time to calculate the trapezoidal area under the line segment joining the two rates. For the initial boundary region the air flow samples on either side of pulse A are averaged and the average is multiplied by the period between the cylinder pulse A and the first sample time. For the final boundary region, the last measured air flow rate is multiplied by the period between the last sample time and the cylinder pulse B to approximate the mass air flow on the assumption of constant flow rate during that partial period.

Figure 9:
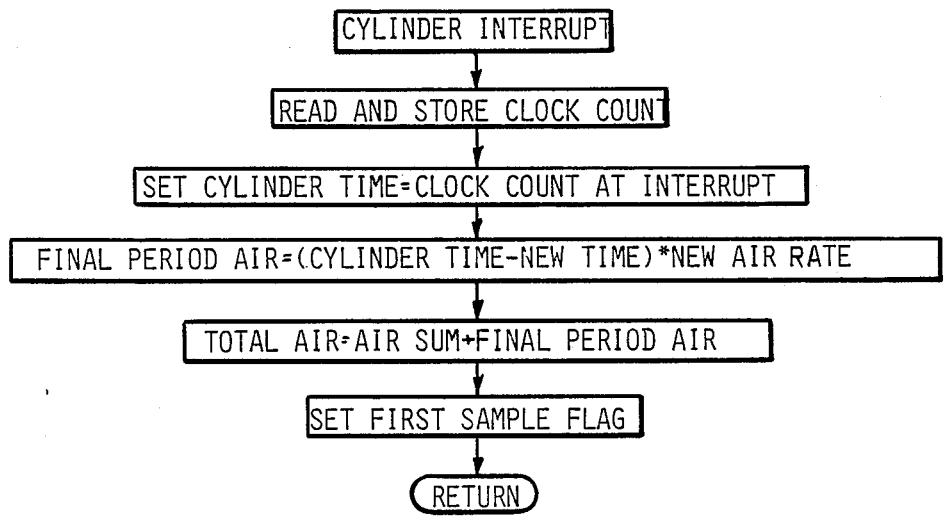

FIGS. 5, 6 and 7 illustrate the operations for the integration process and help explain the terms used in the flowcharts of FIGS. 8 and 9. The most recent air flow rate is NEW AIR RATE, RN measured at NEW TIME, tN and the previous measurement at OLD TIME, tO is the OLD AIR RATE, RO. The cylinder pulse occurs at CYLINDER TIME, tC. The AVERAGE AIR RATE, RAV is (RN+RO)/2. The TIME PERIOD, TPER is tN−tC for the first boundary region and is tN−tO for a regular period. The air mass calculated for a given period is AIR PERIOD, APER and the accumulated air mass in the interval prior to the end of the interval is AIR SUM, ASUM. The final boundary region has its air mass FINAL PERIOD AIR, AFP=(tO−tN)*RN. The interval total air flow mass AIR TOTAL=ASUM+AFP.

These calculations are performed in the computer using two interrupt routines for accommodating the fixed rate sampling arrangement and the cylinder position dependent measurement interval. The flow chart of FIG. 8 shows the time interrupt routine which is executed at each sample time. At the time interrupt the clock time and the air flow rate are read and stored. Previously stored values are assigned to the OLD AIR RATE and the OLD TIME. The most recent stored values are assigned to the NEW AIR RATE and the NEW TIME. Then the AVERAGE AIR RATE is calculated from the NEW and OLD AIR RATEs. If this is the first sample time in the current cylinder interval, as indicated by a flag, the flag is reset and the AIR SUM is set to zero. The TIME PERIOD is then calculated from the NEW AIR RATE and the CYLINDER TIME. If this is not the first sample time in the interval, the TIME PERIOD is calculated from the NEW TIME and the OLD TIME. The PERIOD AIR is determined by multiplying the AVERAGE AIR RATE and the TIME PERIOD. The AIR SUM is updated by adding the PERIOD AIR to the previous AIR SUM. FIG. 5 shows the shaded rectangle as AIR SUM, which for the initial boundary region is the same as the PERIOD AIR. FIG. 6, when compared with FIG. 5 shows how the values are reassigned to the parameters. The AIR SUM value is now represented by two shaded rectangles, the second rectangle having been added as the new AIR PERIOD. The routine returns to the main program loop until another time interrupt occurs or a cylinder interrupt occurs.

The cylinder interrupt starts the execution of the routine shown in FIG. 9. It causes the clock count to be stored and assigned to the CYLINDER TIME. The FINAL PERIOD AIR Is calculated as the difference of the CYLINDER TIME and the NEW TIME multiplied by the NEW AIR RATE, as those values were defined in the previous time interrupt routine. Then the FINAL PERIOD AIR is added to the AIR SUM to obtain the TOTAL AIR. Finally the first sample flag is set and control is returned to the main loop.

It will be apparent that the method and apparatus for measuring the mass air flow for each cylinder through the synchronous meshing of time and position driven programs is precise and fast so that accurate predictions of the air intake for a given cylinder enable correct and timely fuel calculations to be made.

The embodiments of the invention in which an exclusive property or privilege is claimed are defined as follows:

1. The method of measuring mass air flow for each cylinder of an engine comprising the steps of
    allocating an air flow measuring interval to each cylinder,
    generating cylinder position signals indicating beginning and end boundaries of the air flow measuring interval for each cylinder,
    periodically sampling air flow rate at sampling times set by a fixed sampling rate to provide a plurality of whole sampling time periods in each air flow measuring interval and partial sampling time periods at the beginning and end of each air flow measuring interval,
    integrating the air flow rate in each whole sampling time period in each air flow measuring interval to determine the mass air flow in each whole sampling time period,
    calculating the mass air flow in each partial sampling time period in each air flow measuring interval, and
    accumulating the mass air flows calculated in each air flow measuring interval to determine the total mass air flow for the corresponding cylinder.

2. The method of measuring mass air flow as defined in claim 1 wherein the air flow rate in each whole sampling time period is integrated by averaging the air flow rates at the beginning and end of each whole sampling time period and multiplying the average by the whole sampling time period.

3. The method of measuring mass air flow as defined in claim 1 wherein the beginning partial sampling time period for the air flow measuring interval for a cylinder is initiated by the cylinder signal for that cylinder and terminated by the first sampling time in the air flow measuring interval, and
    the mass air flow in the beginning partial sampling time period is calculated by averaging the air flow rate of the whole sampling time period spanning the beginning of the air flow measuring interval, calculating the time between the cylinder signal and the first sampling time, and multiplying the average air flow rate by the calculated time.

4. The method of measuring mass air flow as defined in claim 3 wherein the end partial sampling time period is initiated by the last sample time in the air flow measuring interval and is terminated by the next cylinder signal, and
    the mass air flow in the end partial sampling time period is calculated by calculating the time between the last sample time and the next cylinder signal, and multiplying the calculated time by the last sampled flow rate.

5. Means for measuring mass air flow for each cylinder of an engine comprising:
    signal means coupled to the engine for generating cylinder pulses as a function of cylinder positions to provide cylinder intervals,
    an air flow meter for measuring air flow rate at fixed sampling times independent of cylinder position, the sampling times occurring repetitively during each cylinder interval, and
    microprocessor based means coupled to the signal means and the meter for calculating mass air flow and programmed to
    (a) determine the average air flow rate for each whole period between sampling times in each cylinder interval and the mass air flow for each such whole period,
    (b) determine the approximate flow rates and the times of each partial period between sampling times and cylinder pulses and determine the mass air flow from the determined times and flow rates, and
    (c) sum the mass air flow of all the whole periods and partial periods for each cylinder interval whereby the mass air flow for a given cylinder is obtained.

6. Means for measuring mass air flow for each cylinder of an engine comprising:
    signal means coupled to the engine for generating cylinder pulses at times corresponding to defined cylinder positions to provide cylinder intervals,
    an air flow meter for measuring air flow rate at fixed sampling times independent of cylinder position, the sampling times occurring repetitively during each cylinder interval, thereby defining whole periods between sampling times and partial periods between adjacent cylinder pulse times and sampling times, and
    microprocessor based means coupled to the signal means and the meter for calculating mass air flow and programmed to
    (a) integrate the flow rate in each whole sampling period in a cylinder interval to determine the mass flow in each whole period,
    (b) calculate the mass flow in each partial period in a cylinder interval, and
    (c) accumulate the mass flows calculated in the cylinder interval to determine the total mass air flow for the corresponding cylinder.

7. Means for measuring mass air flow for each cylinder of an engine comprising:
    signal means coupled to the engine for generating cylinder pulses at times corresponding to defined cylinder positions to provide cylinder intervals,
    an air flow meter for measuring air flow rate at fixed sampling times independent of cylinder position, the sampling times occurring repetitively during each cylinder interval, thereby defining whole periods between sampling times and partial periods between first and second adjacent cylinder pulse times and sampling times, and
    microprocessor based means coupled to the signal means and the meter for calculating mass air flow and programmed to (a) average the flow rates of adjacent pairs of measured flow rates to determine the average rate for each whole period, (b) determine the value of each whole period from the sampling times, (c) determine the value of the first partial period from the first cylinder pulse time and the first sampling time, (d) multiply each average flow rate by the corresponding whole period or first partial period, to obtain mass air flow increments, (e) determine the value of the final partial period from the second cylinder pulse time and the previous sampling time, (f) multiply the flow rate for the previous sampling time and the value of the final partial period to obtain a final mass air flow increment, and (g) sum the mass air flow increments to obtain the total mass air flow corresponding to the cylinder interval.

* * * * *